(12) United States Patent
Blanchard

(10) Patent No.: US 8,671,791 B2
(45) Date of Patent: Mar. 18, 2014

(54) DEVICE FOR REVERSING THE DIRECTION OF AN AUTOMOTIVE WHEELED VEHICLE

(75) Inventor: Robert Blanchard, Le Boupere (FR)

(73) Assignee: France Reducteurs, Les Herbiers (FR)

( * ) Notice: Subject to any disclaimer, the term of this patent is extended or adjusted under 35 U.S.C. 154(b) by 842 days.

(21) Appl. No.: 12/793,044

(22) Filed: Jun. 3, 2010

(65) Prior Publication Data

US 2010/0307269 A1    Dec. 9, 2010

(30) Foreign Application Priority Data

Jun. 3, 2009 (FR) .................................. 09 02657

(51) Int. Cl.
*F16H 3/14* (2006.01)
(52) U.S. Cl.
USPC ............................................................ 74/376
(58) Field of Classification Search
USPC ............ 74/376, 374, 375, 373, 318, 321, 322
See application file for complete search history.

(56) References Cited

U.S. PATENT DOCUMENTS

| | | | | | |
|---|---|---|---|---|---|
| 1,418,805 | A | * | 6/1922 | Klausmeyer | ..................... 74/378 |
| 2,077,663 | A | * | 4/1937 | Batten | .............................. 74/330 |
| 2,121,075 | A | * | 6/1938 | Eason | ......................... 192/48.91 |
| 2,809,533 | A | * | 10/1957 | Emrick | ........................... 477/15 |
| 2,834,227 | A | * | 5/1958 | Sweet | ......................... 74/665 Q |
| 4,267,745 | A | | 5/1981 | Edwards | |
| 6,694,836 | B2 | * | 2/2004 | Kawamoto et al. | ............. 74/371 |
| 6,732,602 | B2 | * | 5/2004 | Lu | ................................ 74/336 R |
| 6,979,275 | B2 | * | 12/2005 | Hiraku et al. | ................. 475/214 |
| 7,390,280 | B2 | * | 6/2008 | Duitsman et al. | ............. 475/306 |

FOREIGN PATENT DOCUMENTS

| | | |
|---|---|---|
| FR | 2 880 665 A1 | 7/2006 |
| GB | 2 086 999 A | 5/1982 |

OTHER PUBLICATIONS

French Search Report, dated Feb. 4, 2010, from corresponding French application.

* cited by examiner

*Primary Examiner* — Troy Chambers
*Assistant Examiner* — Jude Agendia
(74) *Attorney, Agent, or Firm* — Young & Thompson

(57) ABSTRACT

A direction-reversing device includes at least one input shaft, an output shaft, and direction-reversing element with a clutch sleeve including a moving clutch sleeve, mounted to move axially on one of the shafts carrying it to enable occupying forward and reverse positions. This device also includes a blocking element that is driven in rotation by the input shaft that carries the moving clutch sleeve, whereby this blocking element is mounted to move between the off position, in which the moving clutch sleeve is able to switch from one operating position to the next, and the on position, in which the blocking element forms an obstacle that prevents the switching of the moving clutch sleeve from one position to the next, being able to switch automatically from the off position to the on position when the input shaft is driven at a speed of rotation that exceeds a predetermined threshold value.

20 Claims, 7 Drawing Sheets

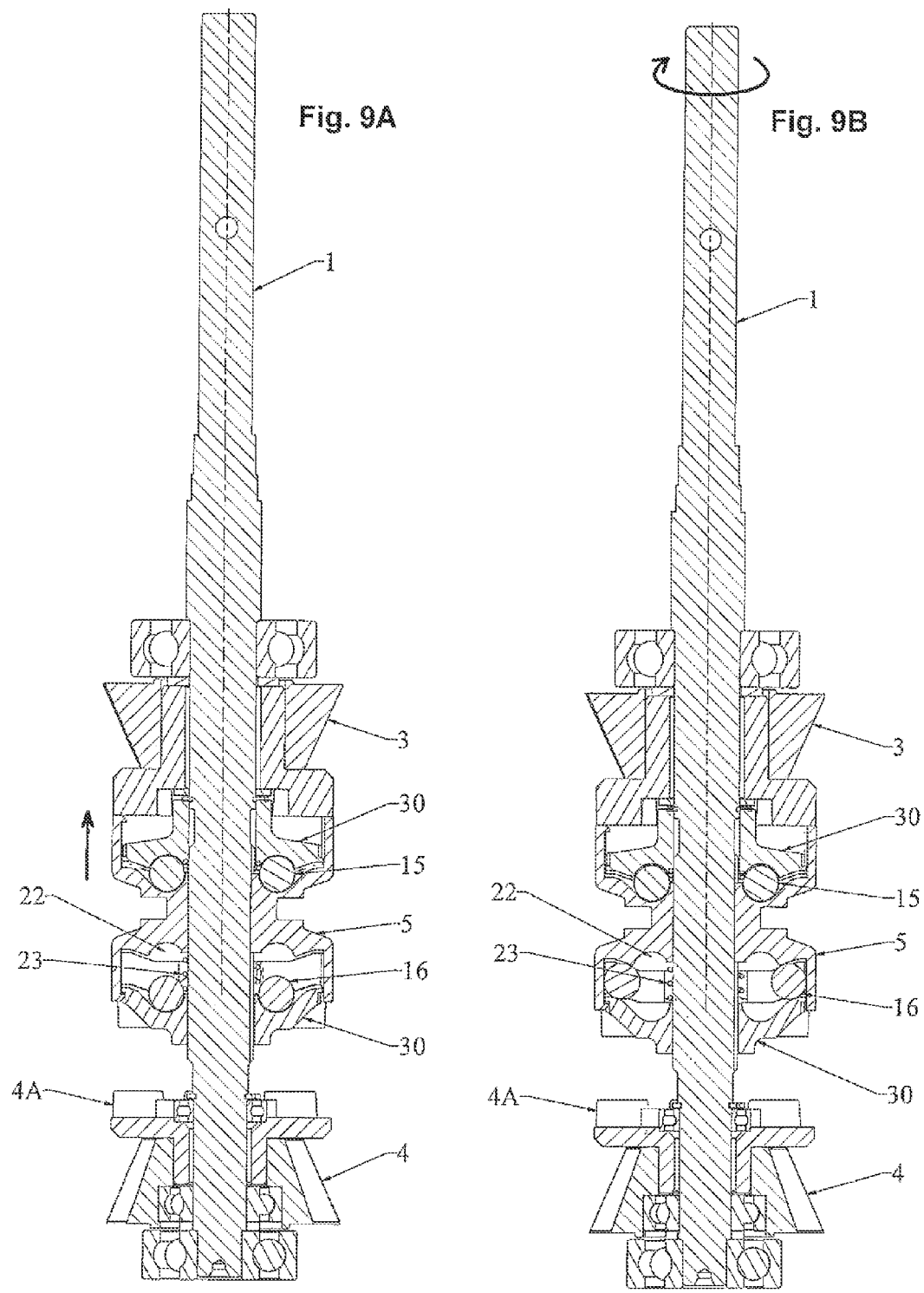

DEVICE FOR REVERSING THE DIRECTION OF AN AUTOMOTIVE WHEELED VEHICLE

BACKGROUND OF THE INVENTION

1. Field of the Invention

This invention relates to a device for reversing the direction of an automotive wheeled vehicle of the type that can be positioned between the drive shaft and the wheels of said vehicle, as well as a transmission that integrates such a direction-reversing device.

2. Description of the Related Art

To date, such direction-reversing devices have been rarely used because they require that the vehicle be completely stopped and that the clutch sleeve elements no longer rotate for switching from forward to reverse or vice versa. The drivers of such vehicles rarely take such precautions so the risks of fracture are significant.

In addition, today such direction-reversing devices are dangerous for the user of the vehicle. Actually, when direction is reversed at high speed, it is noted that the vehicle bucks and the front wheels of the tractor lift to a considerable extent and can cause the vehicle to turn over.

SUMMARY OF THE INVENTION

One object of this invention is therefore to propose a device for reversing the direction and a transmission of the above-mentioned type whose designs make possible in a reliable and certain manner the forward/reverse switching of said vehicle without the risk of fracture of the direction-reversing device or accidents by the user.

For this purpose, the invention has as its object a device for reversing the direction of an automotive wheeled vehicle of the type that can be positioned between the drive shaft and the wheels of said vehicle, whereby said device comprises at least one input shaft that can be connected by a preferably disengageable device for transmission of movement to the drive shaft of said vehicle, to be driven in rotation in one and the same direction, and a forward/reverse output shaft, whereby direction-reversing means with a clutch sleeve comprise—carried by one of said shafts—two clutch sleeve elements: one called a forward clutch sleeve element, and the other called a reverse clutch sleeve element, and a moving clutch sleeve that is interposed between said forward and reverse clutch sleeve elements, whereby said forward and reverse clutch sleeve elements are mounted, permanently engaged with the input or output shaft that does not carry them, and which can be rotationally coupled with/disengaged from the shaft that carries them by means of said moving clutch sleeve, whereby this moving clutch sleeve, integral in rotation with the shaft that carries it at least below a predetermined torque, is mounted to move axially on said shaft via the movement control means to be able to occupy at least two positions: one called the forward position, in which the clutch sleeve teeth of the moving clutch sleeve are engaged with the clutch sleeve teeth of the forward clutch sleeve element, and the other called the reverse position, in which the clutch sleeve teeth of the moving clutch sleeve are engaged with the clutch sleeve teeth of the reverse clutch sleeve element, characterized in that the device also comprises at least one blocking system that comprises at least one blocking element that is carried by the input shaft and that can be driven in rotation by said shaft, whereby said at least one blocking element is an element that is mounted to move between at least two positions: one called the off position, in which the moving clutch sleeve is able to switch from one operating position to the next, and the other called the on position, in which said blocking element forms an obstacle that directly or indirectly prevents the switching of said moving clutch sleeve from one position to the next, whereby said at least one blocking element, sensitive to the speed of rotation of the input shaft, is able to switch automatically from the off position to the on position when the input shaft that carries it is driven at a speed of rotation that exceeds a predetermined threshold value.

Thanks to the presence of a blocking system whose operation is directly linked to the speed of rotation of the shaft that carries it and whose switching to the off position is possible only if the shaft that carries it is driven at a speed of rotation that is less than a speed of rotation of a predetermined threshold, any reversal of direction is reliably prevented when the shaft that carries clutch sleeves, and as a result, the moving clutch sleeve rotate at a speed that exceeds the speed that is allowed to ensure a reliable reversal of direction.

According to a first embodiment of the invention, the blocking element forms an obstacle that indirectly prevents the shifting of the moving clutch sleeve from one position to the next by acting on the latter via the movement control means of the moving clutch sleeve.

In this first embodiment, the movement control means of the moving clutch sleeve comprise at least one control unit with preferably manual control, mounted to move between a forward control position of the moving clutch sleeve and a reverse control position of the moving clutch sleeve, and the blocking element or at least one of the blocking elements of the blocking system has at least one on position in which it forms an obstacle that prevents the switching of said control element from one control position to the next.

The blocking system is preferably equipped with return means of said at least one blocking element in the off position. Said—or at least one—blocking element is, for its switching from the off position to the on position and vice versa, an element that is mounted to move axially along an axis that is parallel to the longitudinal axis of the input shaft that carries it. In the on position, the blocking element is arranged on the path that is followed by the movement control element of the moving clutch sleeve for its switching from one control position to the next.

Thanks to the fact that the blocking element is, for its switching from the off position to the on position and vice versa, an element that is mounted to slide along the shaft that carries it, such an element is able to act both during the switching from the forward position to the reverse position of the vehicle or vice versa during the switching from the reverse position to the forward position of said vehicle.

The blocking element is therefore a polyvalent element. A simplification of the unit results.

In a second embodiment of the invention, the blocking element forms an obstacle that directly prevents the switching of the moving clutch sleeve from one position to the next by acting directly on the latter.

For this purpose, the blocking element or one of the blocking elements of the blocking system has at least one on position in which it forms an obstacle that prevents the switching of said moving clutch sleeve from one position to the next.

BRIEF DESCRIPTION OF THE DRAWING FIGURES

The invention will be better understood from reading the following description of embodiments with reference to the accompanying drawings, in which.

Figure 1:
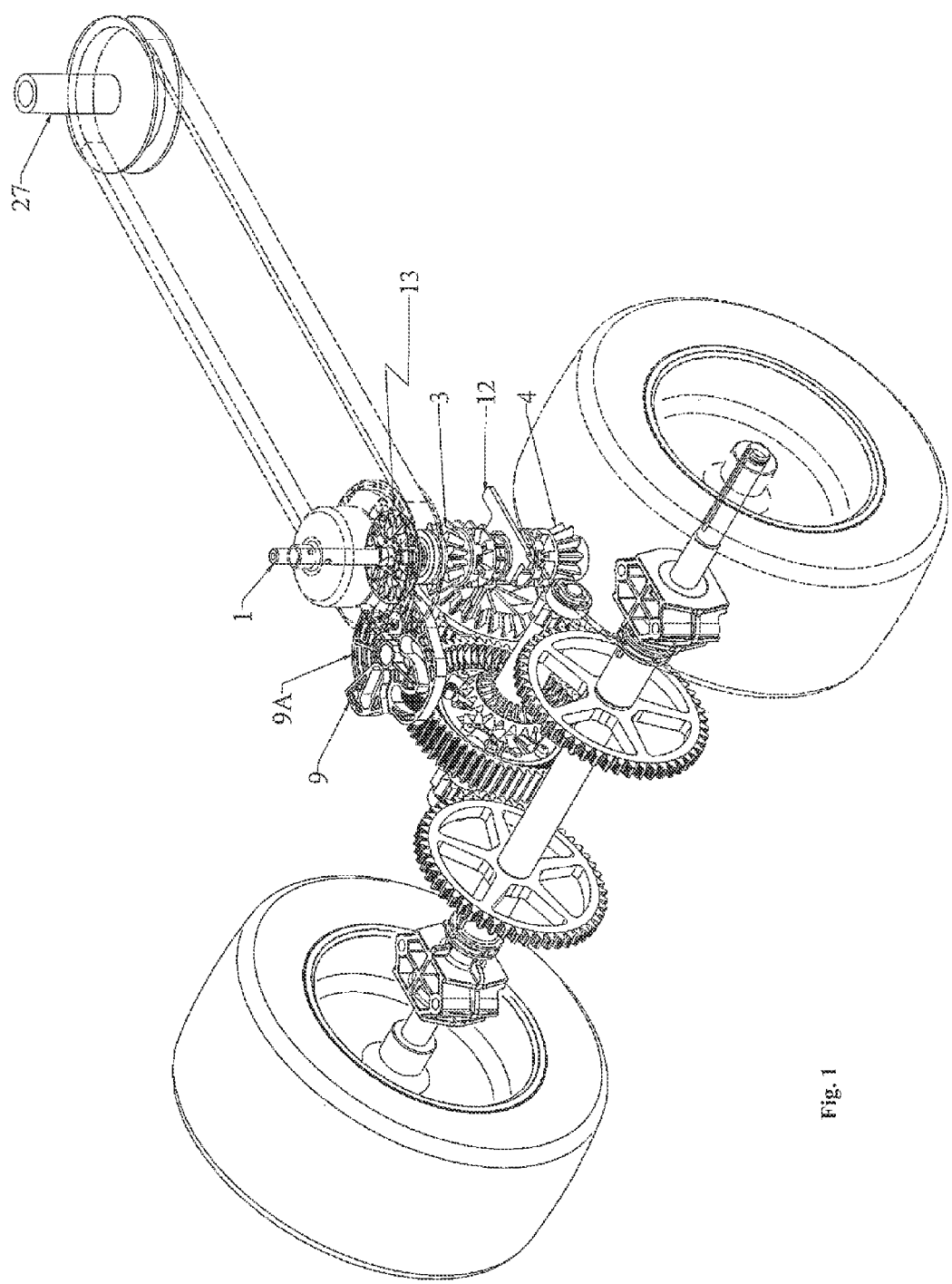
FIG. 1 shows a perspective overall view of a transmission according to the invention.
Figure 2A:
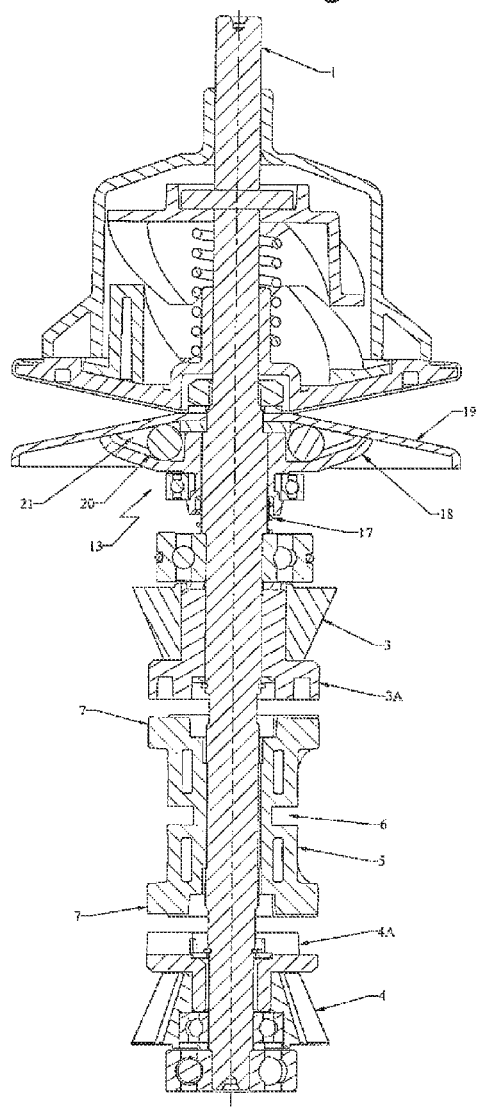
FIG. 2A shows a cutaway view of the input shaft that carries direction-reversing means and the pulley of a speed controller in the off position of the blocking element of the blocking system and in neutral position of the moving clutch sleeve.
Figure 3A:
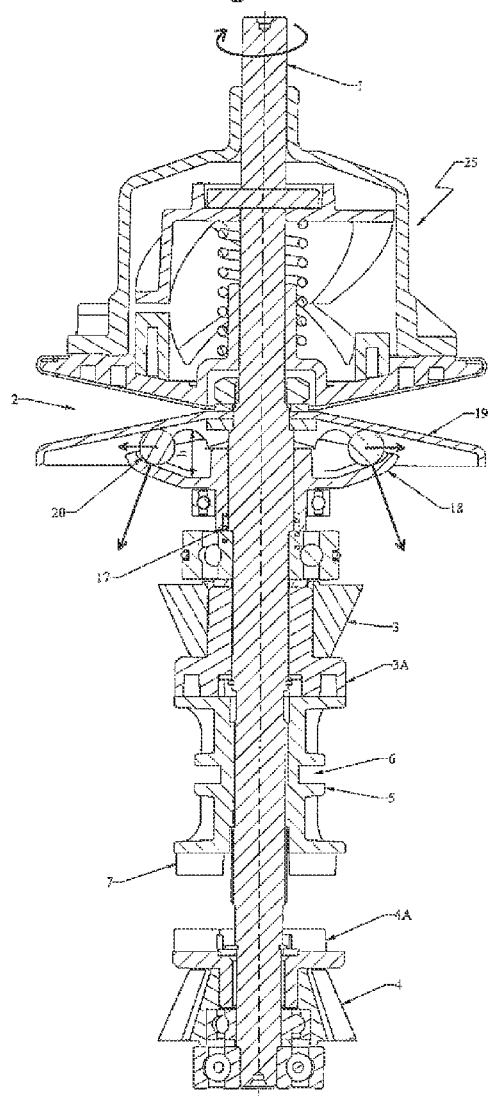
FIG. 3A shows a cutaway view of the input shaft that carries the direction-reversing means and the pulley of a speed controller in the on position of the blocking element of the blocking system and in a forward jaw-clutching position of the moving clutch sleeve.
Figure 2B:
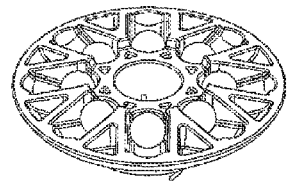
FIG. 2B shows a perspective view of the blocking element of FIG. 2A.
Figure 3B:
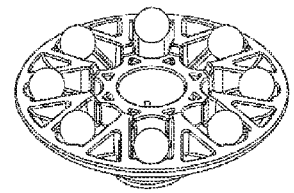
FIG. 3B shows a perspective view of the blocking element of FIG. 3A.
Figure 4A:
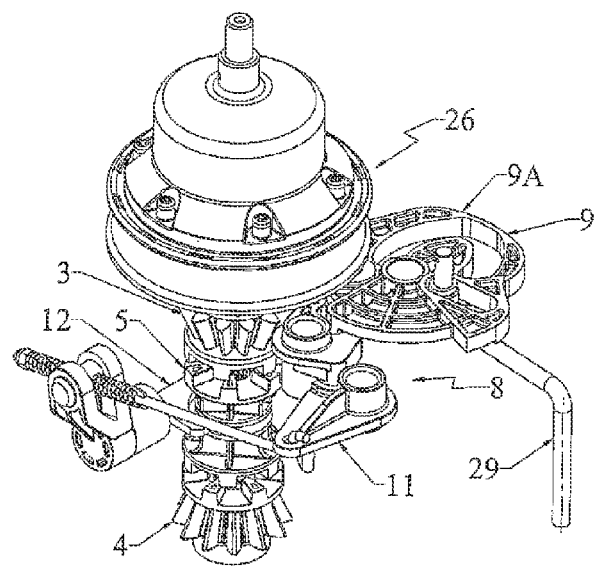
FIGS. 4A to 4C show partial perspective views of the input shaft that carries direction-reversing means and a pulley of the speed controller in respectively neutral, forward and reverse positions of the moving clutch sleeve.
Figure 4B:
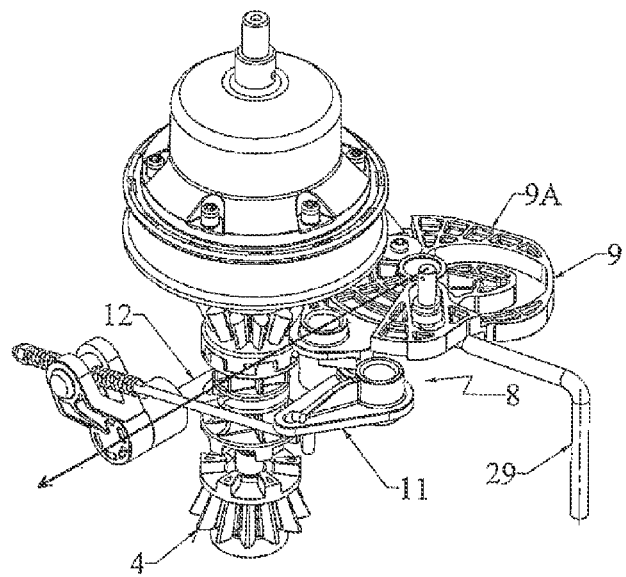
Figure 4C:
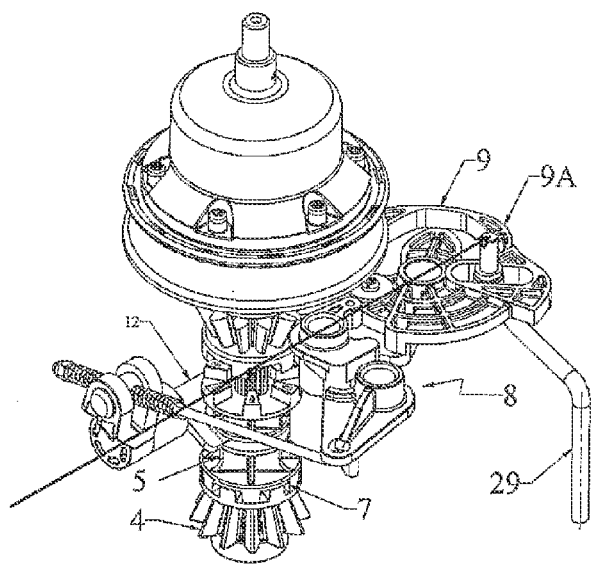

FIGS. 9A and 9B each represent a cutaway view of another embodiment of the blocking elements respectively in the off position (FIG. 9A) and in the on position (FIG. 9B).

DETAILED DESCRIPTION OF THE INVENTION

As mentioned above, the device that is the object of the invention is intended to allow the reversal of direction, i.e., the switching from forward to reverse or vice versa, of an automotive wheeled vehicle, such as a mower.

This direction-reversing device can be positioned between the drive shaft 27 and the wheels of the vehicle, whereby the shaft generally carries the cutting blade in the case of an application for a mower.

This device comprises at least one input shaft 1 that can be connected by a preferably disengageable device 25 for transmission of movement and/or variable-speed transmission to the drive shaft of said vehicle to be driven in rotation in one and the same direction, a forward/reverse output shaft 2, and direction-reversing means with a clutch sleeve.

The device 25 for transmission of movement by means of which the movement of the drive shaft is transmitted to the input shaft 1 of the direction-reversing device is a generally endless, disengageable transmission and/or variable-speed transmission that comprises at least one belt and two pulleys around which the belt winds, whereby at least one of the pulleys is carried by the input shaft of the direction-reversing device.

In the examples that are shown, the device 25 for transmission of movement from the drive shaft to the input shaft comprises at least one speed controller with a belt that is formed by at least one belt and two pulleys, whereby at least one of the pulleys has variably-spaced flanges.

The direction-reversing means with a clutch sleeve comprise—carried by one of the shafts shown at 1 or 2—two clutch sleeve elements: one, shown at 3 in the figures, called the forward clutch sleeve element, and the other, shown at 4 in the figures, called the reverse clutch sleeve element, and a moving clutch sleeve 5 that is interposed between said elements 3 and 4 of the forward and reverse clutch sleeves.

The elements 3 and 4 of the forward and reverse clutch sleeves are mounted in permanent engagement with the input or output shaft 1 that does not carry them, and mounted to be rotationally coupled with/disengaged from the shaft that carries them by means of the moving clutch sleeve 5.

Figure 8A:
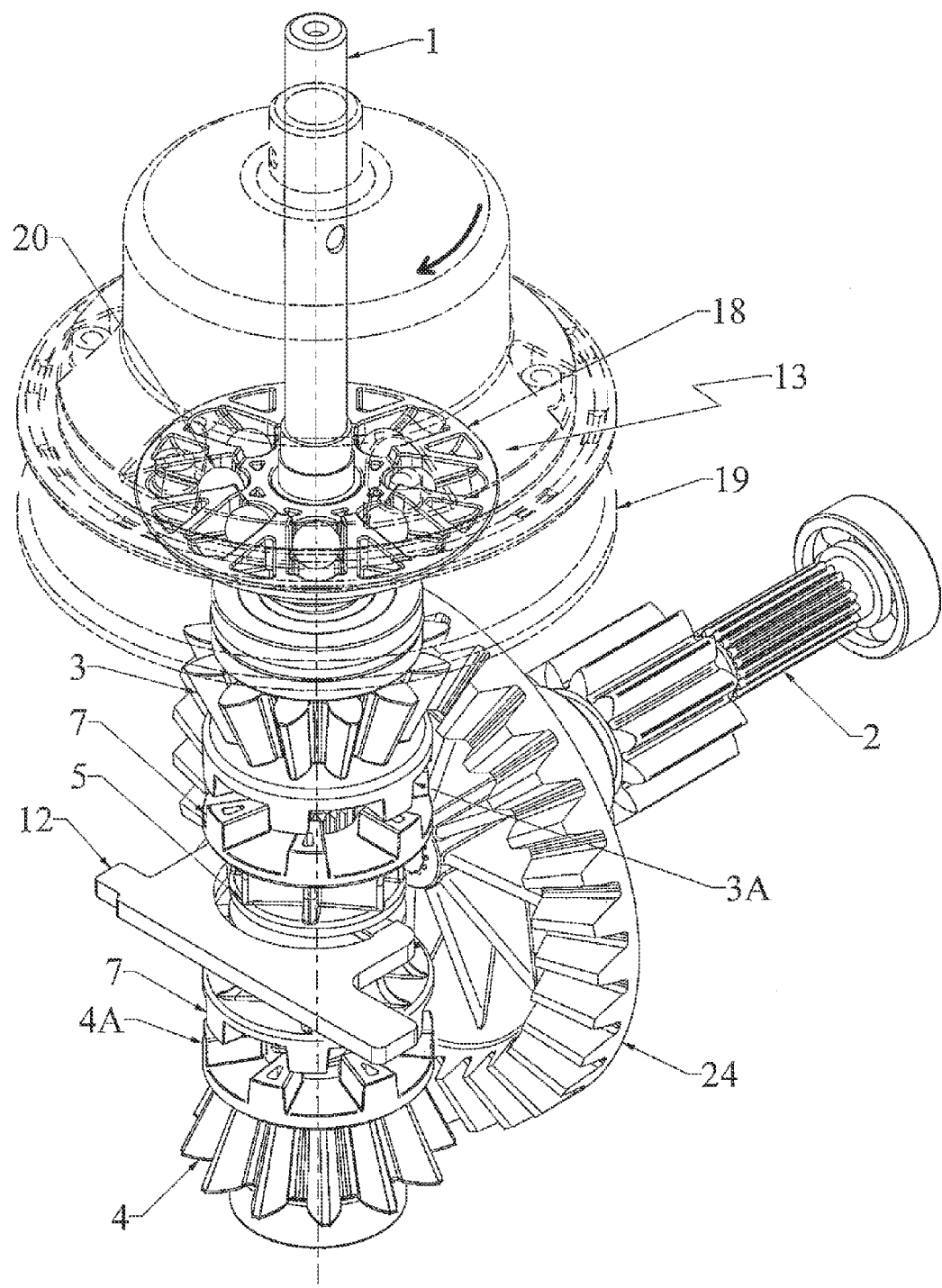
FIG. 8A shows a perspective view of a part of the transmission according to the invention, whereby the direction-reversing means are carried by the input shaft.

Thus, in FIG. 8A, the forward and reverse clutch sleeve elements 3, 4 and the moving clutch sleeve 5 are carried by the input shaft 1, and the forward and reverse clutch sleeve elements 3, 4 can be rotationally coupled with/disengaged from said input shaft 1 and are permanently engaged with the forward/reverse output shaft 2 that does not carry them.

Figure 8B:
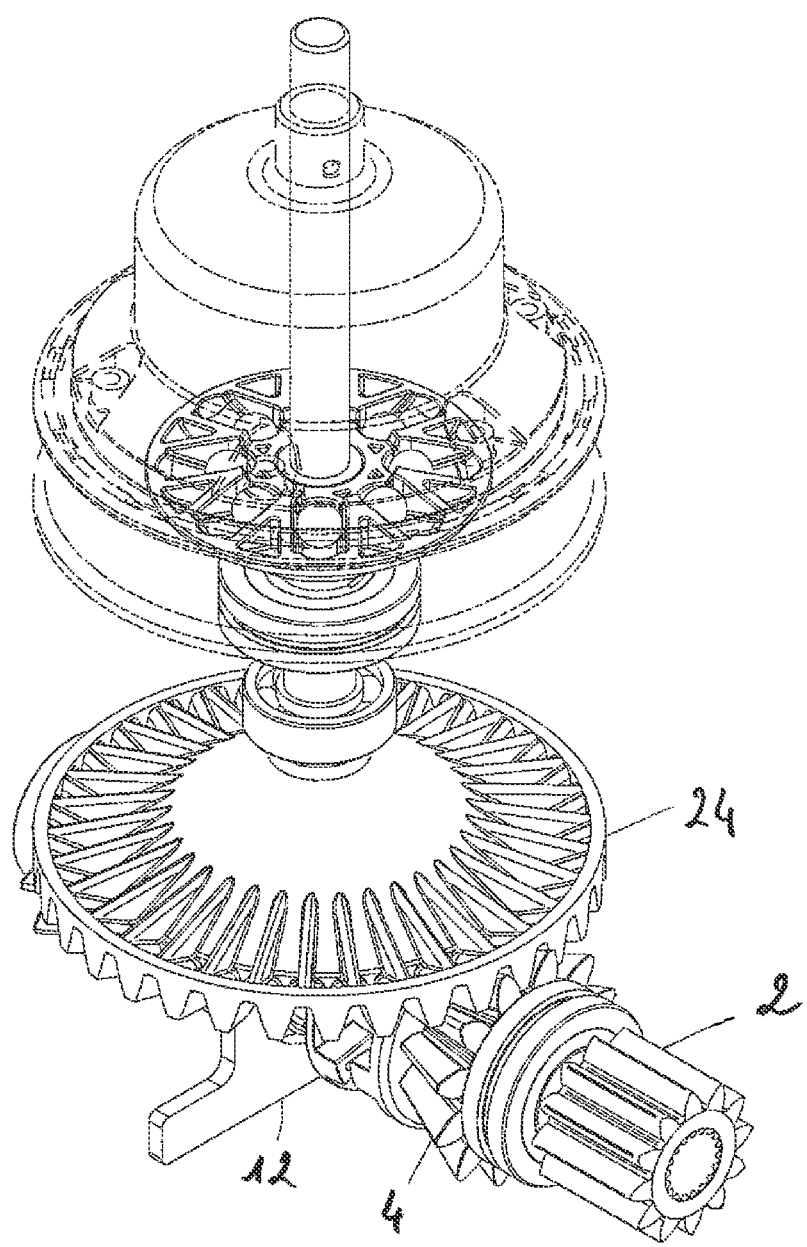
FIG. 8B shows a perspective view of a part of the transmission according to the invention, whereby the direction-reversing means are carried by the forward/reverse output shaft.

In FIG. 8B, the reverse solution is shown.

The moving clutch sleeve 5 that is integral in rotation with the shaft that carries it, at least below a predetermined torque, is mounted to move axially on said shaft via movement control means 8 to be able to occupy at least two positions: one called the forward position in which the clutch sleeve teeth 7 of the moving clutch sleeve 5 are engaged with the clutch sleeve teeth 3A of the forward clutch sleeve element 3, and the other called the reverse position in which the clutch sleeve teeth 7 of the moving clutch sleeve 5 are engaged with the clutch sleeve teeth 4A of the reverse clutch sleeve element 4.

In the examples that are shown, the moving clutch sleeve 5 comes in the form of a sleeve that is mounted integral in rotation with the shaft 1 or 2 that carries it and is equipped at each of its ends with clutch sleeve teeth 7 that form a circular serration. The forward and reverse clutch sleeve elements 3, 4, which preferably each assume the shape of a conical pinion that is equipped on one of its surfaces with clutch sleeve teeth 3A, 4A, are mounted in permanent engagement with the shaft 2 or 1, which does not carry them by engaging with a so-called gear part 24 that is carried by said shaft.

This gear part 24 is formed here by a gearwheel, whereby the set of teeth comes in the form of a crown made on one of the surfaces of the wheel.

FIG. 8A illustrates the case where the clutch sleeve elements and the moving clutch sleeve are mounted on the input shaft of the direction-reversing device and where the clutch sleeve elements that are called contra-rotating elements rotate in the opposite direction of rotation and—by engaging with the part 24, mounted integral in rotation with the forward/reverse output shaft—cause: one—the rotation in one direction of said part 24, and the other—the rotation in the opposite direction of rotation of said part 24.

FIG. 8B illustrates the case where the clutch sleeve elements and the moving clutch sleeve are mounted on the forward/reverse output shaft 2 and are permanently engaged with the gear part 24 that is mounted integral in rotation with the input shaft 1, whereby this part 24 entrains the clutch sleeve elements 3 and 4 in two opposite directions of rotation, whereby the elements 3 and 4 are called contra-rotating as in the case shown in FIG. 8A.

The device also comprises—for the switching of the moving clutch sleeve 5 from the forward position to the reverse position by preferably switching via a neutral position into which the teeth of the clutch sleeve of the moving clutch sleeve 5 are engaged neither with the teeth 3A of the forward clutch sleeve element 3 nor with the teeth 4A of the reverse clutch sleeve element 4—movement control means 8 of said moving clutch sleeve.

These movement control means 8 will be described in more detail below.

Finally, and in a manner that is characteristic of the invention, the direction-reversing device also comprises at least one blocking system 13 that comprises at least one blocking element 14 or 15, 16 that is carried by the input shaft 1 and that can be driven in rotation by said shaft, whereby said at least one blocking element is an element that is mounted to move between at least two positions: one called off in which the moving clutch sleeve is able to switch from one position to the next, and the other called on in which said blocking element forms an obstacle that directly or indirectly prevents the switching of said moving clutch sleeve from one position to the next, whereby said at least one blocking element, sensitive to the speed of rotation of the input shaft that carries it, is able to switch automatically from the off position to the on position when the input shaft that carries it is driven at a speed of rotation that exceeds a predetermined threshold value.

In a first embodiment of the invention, in accordance with FIGS. 1 to 8B, the movement control means 8 of the moving clutch sleeve 5 comprise at least one control element 9 with preferably manual control, mounted to move between a forward control position of the moving clutch sleeve and a reverse control position of the moving clutch sleeve, and the blocking element or at least one of the blocking elements of the blocking system 13 has at least one on position in which it forms an obstacle that prevents the switching of said control element 9 from one control position to the next. The blocking system 13 is equipped with return means 17 of said at least one blocking element 14 in off position. Said blocking element or at least one blocking element 14 is—for its switching from the off position to the on position and vice versa—an element that is mounted to move axially along an axis that is parallel to the longitudinal axis of the shaft 1 or 2 that carries it. In the on position, the blocking element 14 is arranged on the path that is followed by the movement control element 9 of the moving clutch sleeve 5 for its switching from one control position to the next.

In this embodiment, the blocking system 13 is formed by at least, on one hand, two preferably plate-type elements 18, 19, cup or flange, hollowed out, generally centrally, to be able to be slipped onto the input shaft that carries them and to be driven in rotation by said shaft, and, on the other hand, balls 20 that are sandwiched between said elements 18, 19, whereby said elements 18, 19, that are equipped with return means 17 in close position, comprise opposite surfaces that delimit a plurality of cages 21 with balls arranged radially around the carrying shaft, with each cage 21, which forms a guideway or movement path for at least one ball 20, having a mean height h for housing the ball, taken parallel to the axis of the carrying shaft 1, which decreases or respectively increases from the so-called central hollowed-out zone toward the periphery of said elements 18, 19 so as to cause, by movement of the balls 20 in their guideway that results from driving in rotation the carrying input shaft 1 beyond a predetermined speed of rotation, a separation or respectively a drawing-together of said elements 18, 19, whereby at least one 18 of the elements 18, 19 forms—in separated position or respectively drawn-together position of the other element 19—the blocking element 14 of said blocking system 13. This cage is preferably arranged to form a series of ball housings from the hollowed-out zone to the periphery of the elements 18, 19. The height h that is taken at each housing corresponds to an average of the heights of said housing. The opposite surfaces that delimit each housing are curved surfaces with a concavity rotated toward one another.

In this embodiment, the movement control means 8 of the moving clutch sleeve 5 comprise at least one rotary cam 9A with manual rotary control and a fork 12 that can be moved angularly, whereby said fork 12 is equipped with at least one inside radial tooth that can be inserted inside an outside peripheral annular groove 6 of the sleeve that constitutes the moving clutch sleeve 5, whereby cam 9A and fork 12 are coupled to one another by means of at least one lever 11. In the example that is shown, the cam 9A is coupled to the fork 12 by means of at least two levers that can transform the movement of rotation of the cam into an angular movement of the fork 12. The blocking element 14 of the blocking system 13 has a circular peripheral surface that forms, in the on position of said element 14, a support surface of the control element 9 that has at least one part that extends essentially tangentially to said surface.

Figure 5A:
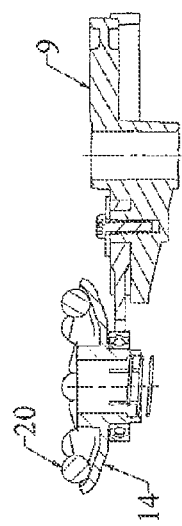
FIG. 5A shows a partial cutaway view of the control means and the blocking system in the off position of the blocking element when the moving clutch sleeve is in neutral position.
Figure 6A:
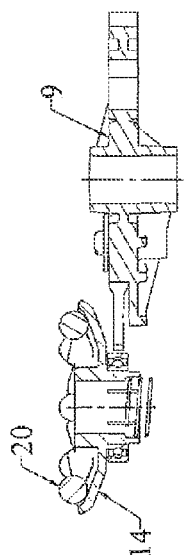
FIG. 6A shows a partial cutaway view of the control means and the blocking system in the on position of the blocking element when the moving clutch sleeve switches from the neutral position to the forward position.
Figure 7A:
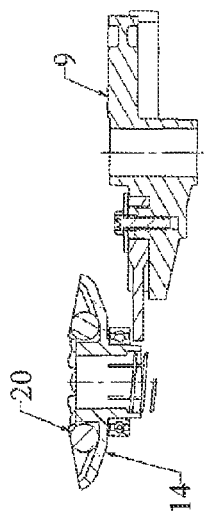
FIG. 7A shows a partial cutaway view of the control means and the blocking system in the on position of the blocking element when the control element controls the moving clutch sleeve in movement for its switching from the forward position to the reverse position whereas the shaft that carries said clutch sleeves rotates at a speed that exceeds a predetermined threshold value.
Figure 5B:
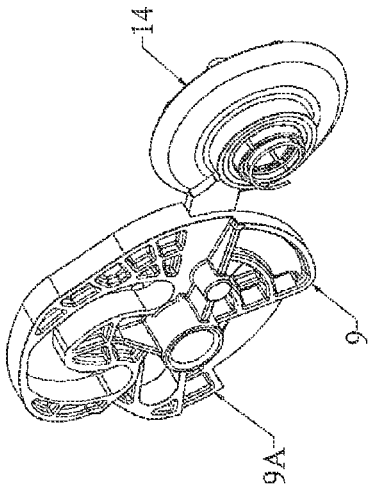
FIG. 5B shows a perspective view of a part of the elements of FIG. 5A.
Figure 6B:
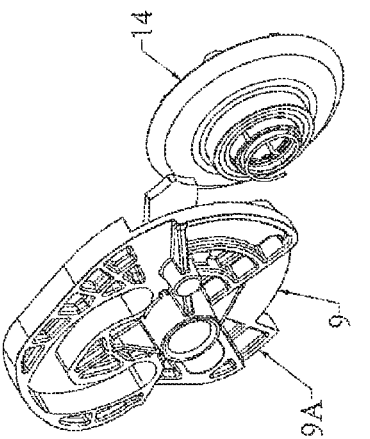
FIG. 6B shows a perspective view of a part of the elements of FIG. 6A.
Figure 7B:
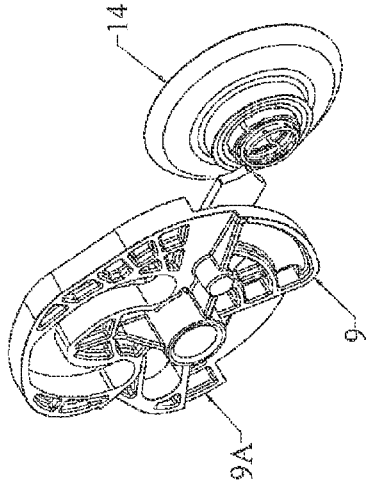
FIG. 7B shows a perspective view of a part of the elements of FIG. 7A.

The operation of such a device is as follows: in the non-engaged state of the transmission of movement between drive shaft and input shaft 1, and in a neutral position of the moving clutch sleeve, corresponding to FIG. 5A, i.e., in a position in which the clutch sleeve teeth 7 of the moving clutch sleeve 5 are engaged neither with the teeth 3A of the forward clutch sleeve element 3 nor with the teeth 4A of the reverse clutch sleeve element 4, the input shaft 1 does not rotate, and the blocking element 14 is in off position. When the user activates the control means via a foot control, such as a pedal, or a hand control, such as a lever, or a twist grip, positioned in the handle of the vehicle, it acts on the linkage 29 that causes the rotation of the cam 9A in a clockwise direction if a forward clutch sleeve is controlled or in a counterclockwise direction if a reverse clutch sleeve is controlled.

In a first step, the rotation of the cam 9A, for example in a clockwise direction, causes—via the levers 11—the angular movement of the fork 12 that itself controls a sliding movement of the moving clutch sleeve 5 along the shaft that carries it up to a position of engagement of the teeth 7 of the moving clutch sleeve 5 with the teeth 3A of the element 3 of the forward clutch sleeve.

The continuation of the movement of the cam causes the movement transmission device 25 to switch from the non-engaged state to the engaged state or the state of driving in rotation of the input shaft 1 at a speed that is lower than a predetermined threshold value to a speed that exceeds said threshold value.

The movement of rotation of the shaft 1 is transmitted via the moving clutch sleeve 5 to the forward clutch sleeve element 3 that itself transmits its movement to the gear part 24 that transmits it to the forward/reverse output shaft 2 that itself directly or indirectly transmits its movement to the wheels of the vehicle.

As soon as the shaft that carries the moving clutch sleeve and the blocking system rotates beyond a predetermined speed, the blocking element 14 of the blocking system, which is driven in rotation by said shaft, switches from the off position to the on position (see FIG. 6A), i.e., it moves here with sliding along the shaft that carries it in the direction here of the moving clutch sleeve in opposition to the return means 17.

The blocking element is formed here by the element 18, which is constituted by a hub flange that is separated from the element 19 that is formed by a plate that is hollowed out centrally under the action of the outside radial movement of the balls that are inserted between the elements 18, 19.

During its sliding movement, the element 18 is positioned on the path followed by the cam 9A, in particular on the path of a radial projection of the cam during the switching of the cam 9A from one control position to the next, such that any switching of the cam from one control position to the next is prevented.

This prevention lasts as long as the element 18 is separated from the element 19, i.e., as long as the shaft 1 that carries the moving clutch sleeve rotates beyond a predetermined speed that corresponds to a threshold value.

When the user directs that direction be reversed, he acts on the cam 9A via the linkage 29 and drives it in the opposite direction. The cam 9A returns into a position in which either it no longer acts on the device 25 for transmission of movement from the drive shaft to the shaft 1 such that the shaft 1 stops rotating, or it acts such that the shaft 1 rotates at a speed that is less than a predetermined threshold value. The element 18 that forms the blocking element 14 of the blocking system 13 then returns into an off position, i.e., into a position brought close together with the element 19 because the centrifugal force resulting from the rotation of the shaft is inadequate for keeping the balls in a position that is said to be separated radially from the carrying shaft in which they keep the elements 18, 19 separated from one another.

The cam 9A can then continue its rotation and act on the fork 12 for allowing, in a first step, the switching of the moving clutch sleeve 5 from a forward position to the neutral position, and if the control is continued by the operator, the switching to a reverse position in which the teeth 7 of the moving clutch sleeve 5 are engaged with the teeth 4A of the reverse clutch sleeve element 4.

Continuation of the driving in rotation of the cam then causes the switching from the disengaged state to the engaged state of the device 25 for transmission of movement or the state of driving the shaft that carries said moving clutch sleeve in rotation at a speed that is less than a predetermined threshold value to a state of driving in rotation at a value that exceeds said threshold value and again the switching of the blocking element 14 from the off position to the on position, as has been described above for forward operation.

Here, the blocking system 13 offers the advantage of being a polyvalent mechanism that can switch from the off position to the on position beyond a predetermined threshold value of the speed of rotation of the shaft that carries the moving clutch sleeve, regardless of the direction-reversing control that is performed, namely a reversal of direction from forward to reverse or conversely from reverse to forward and regardless of the direction in which the shaft is driven in rotation.

In this first embodiment of the invention, it is noted that the element 18 that forms the blocking element 14 of the blocking system consists of two parts. Actually, it comprises a flange with an essentially central hub and a ball bearing arranged around the hub of said flange. The hub makes it possible to slip the flange onto the carrying shaft; this circular flange has a general concave shape, whereby the hollow that is formed is used to receive balls that during their outside radial movement move along the ramp that is made by this hollow shape by resting against the plate-type element 19 opposite said flange 18 to cause a separation of said elements.

Arranged around the hub of the element 18 is a ball bearing that constitutes the surface against which the control element 9 of the control means 8 rests in the on position. In this case, in the examples that are shown, the outside radial projection or the outside radial pin of the cam 9A comes to rest against this ball bearing. This rolling contact prevents any risk of jamming. Thus, in the on position of the blocking element 14, said control element 9 is in a wheeled support contact position on said blocking element 14 that forms a stop that prevents the switching of said control element 9 from one control position to the next.

In this embodiment as described above, it is noted that the direction-reversing device, which is of the type in which the device 25 for transmission of movement from the drive shaft to the input shaft 1, is an endless, disengageable transmission and/or variable-speed transmission that comprises at least one belt and two pulleys around which said belt is wound, whereby at least one 26 of the pulleys is carried by the input shaft 1, and at least one part of the blocking system 13 also forms one of the flanges of the pulley 26 of the device for transmission of movement that is carried by the input shaft 1.

In addition, when the direction-reversing device is of the type in which the device 25 for transmission of movement from the drive shaft to the input shaft 1 is a generally endless, disengageable transmission and/or variable-speed transmission, preferably at least a part of the movement control means 8 of the moving clutch sleeve 5 also forms at least a part of the control means of the variable speed and/or disengagement of the device 25 for transmission of movement.

This last characteristic is also true for the other embodiments of the invention that are described below.

In a second embodiment of the invention, according to, for example, FIGS. 9A and 9B, the blocking system comprises at least one blocking element that acts directly on the moving clutch sleeve and on the switching of the moving clutch sleeve from one position to the next.

In the embodiment that is shown in FIGS. 9A and 9B, the blocking system 13 comprises at least two blocking elements 15, 16 that are selectively active in the forward or respectively reverse jaw-clutching state of said moving clutch sleeve.

Each blocking element 15, 16 is arranged between the moving clutch sleeve 5 and a clutch sleeve element 3, 4. Thus, the blocking element 15 is arranged between the forward clutch sleeve element 3 and the moving clutch sleeve 5, while the blocking element 16 is arranged between the reverse clutch sleeve element 4 and the moving clutch sleeve 5. Each time, the blocking elements 15, 16 are formed from balls. These balls, arranged between the moving clutch sleeve and a clutch sleeve element, are able to move inside the traveling paths 22 that are made by the surfaces opposite the moving clutch sleeve and a plate-type part 30, hollowed out centrally to be able to be slipped onto the carrying shaft of the moving clutch sleeve, whereby said part 30 is interposed between the moving clutch sleeve and the corresponding clutch sleeve element 3, 4. Said traveling paths 22 extend in a radial arrangement around the carrying shaft of the moving clutch sleeve. Each traveling path of at least one ball has a ball housing height that is taken in a direction parallel to the longitudinal axis of the carrying shaft that decreases from the central zone of said clutch sleeves in the direction of the peripheral zone so as to prevent—during an outside radial movement of the balls, arranged beside the non-jaw-clutching clutch sleeve element in the moving clutch sleeve, in their traveling path, whereby this radial movement is caused automatically by the driving in rotation of the carrying shaft of the moving clutch sleeve above a predetermined speed—a drawing-together of the moving clutch sleeve of the non-jaw-clutching clutch sleeve element, and their engagement.

In a manner that is similar to what was described in the first embodiment, the movement control means of the clutch sleeve can comprise at least one rotary cam 9A with manual rotation control and a fork 12 that can be moved angularly, whereby said fork 12 is equipped with at least one inside radial tooth that can be inserted inside an outside peripheral annular groove 6 of the sleeve that constitutes the moving clutch sleeve 5, whereby the cam 9A and the fork 12 are coupled to one another by means of at least one lever 11.

This operation is analogous to what was described for the first embodiment except for the fact that the cam is exempt from being moved and that these are, on the one hand, the balls 16 that—in the jaw-clutching position of the forward clutch sleeve element with the moving clutch sleeve—move radially toward the outside, i.e., in an outside radial manner relative to the carrying shaft for preventing the switching of said moving clutch sleeve from the forward position to the reverse position, and, on the other hand, the balls 15 that extend between the forward clutch sleeve element and the moving clutch sleeve that in jaw-clutching position of the forward clutch sleeve element with the moving clutch sleeve move radially toward the outside to prevent the switching of said moving clutch sleeve from the reverse position to the forward position.

The blocking elements 15, 16 are therefore called selectively active in the jaw-clutching state because they cannot act simultaneously.

Return means 23 are provided between the moving clutch sleeve and the intermediate part 30 that is interposed between the moving clutch sleeve and the forward or respectively reverse clutch sleeve for returning the moving clutch sleeve into a neutral position, i.e., into a position in which it is not engaged either with the forward clutch sleeve element or with the reverse clutch sleeve element and in which the blocking elements 15, 16 are in the off position.

In another embodiment, not shown, the blocking element of the blocking system can be formed by at least one element that is mounted to pivot around an axis that is parallel to the axis of the shaft that carries it when the shaft is entrained at a speed of rotation that exceeds a predetermined threshold value.

As mentioned above, the invention also has as its object a transmission between the drive shaft and the wheels of an automotive wheeled vehicle, whereby this transmission comprises at least one direction-reversing device of the vehicle that is equipped with an input shaft and a device for transmission of movement between the drive shaft and the input shaft of the direction-reversing device, whereby this transmission is characterized by the fact that it comprises a direction-reversing device according to what was described above.

In this transmission, in which the device 25 for transmission of movement from the drive shaft to the input shaft 1 is preferably a generally endless, disengageable transmission and/or variable-speed transmission, at least a part of the movement control means 8 of the moving clutch sleeve 5 also forms at least a part of the control means for the variable speed and/or the disengagement of the device 25 for transmission of movement.

During the switching of the moving clutch sleeve from a non-jaw-clutching or neutral position to a forward position or respectively to a reverse position, these movement control means 8 of the moving clutch sleeve 5 control, in a first step, the switching of said moving clutch sleeve from the neutral position to the forward jaw-clutching position or respectively to the reverse jaw-clutching position, and then, in a second step, the switching of the device 25 for transmission of movement from the disengaged state to the engaged state or respectively from the state of the input shaft of the direction-reversing device being driven in rotation at a speed that is less than a predetermined threshold value to a speed that exceeds said threshold value.

Conversely, during the switching from the forward position, or respectively the reverse position, to the neutral position of the moving clutch sleeve, or during the switching from the forward position to the reverse position or vice versa, the movement control means 8 of the moving clutch sleeve control, in a first step, the switching of the device 25 for transmission of movement from the engaged state to the disengaged state or from the state where the drive shaft 1 is driven in rotation at a speed that exceeds a predetermined threshold value to a value that is less than said threshold value, then, in a second step, the movement of moving clutch sleeve from the forward position or respectively from the reverse position, into the neutral position, and then its switching from the neutral position to the reverse position, i.e., reverse or respectively forward, before again controlling the switching of the device for transmission of movement from the disengaged state to the engaged state or the state of driving the input shaft 1 in rotation at a speed that is less than a predetermined threshold value to a value that exceeds said threshold value.

In addition, when the blocking element of the blocking system is an element that has at least one on position in which it forms an obstacle that prevents the switching of said control element from one position to the next, preferably at least a part of the blocking system also forms one of the flanges of the pulley of the device for transmission of movement that is carried by the input shaft.

The invention claimed is:

1. A device for reversing the direction of an automotive wheeled vehicle, positionable between a drive shaft and wheels of said vehicle, comprising:
    at least one input shaft connectable by a disengageable device for transmission of movement to the drive shaft of said vehicle to be driven in rotation in one and the same direction;
    a forward/reverse output shaft;
    a reversible mechanism comprising a clutch sleeve that is carried by one of said input and output shafts, the clutch sleeve comprising
        a forward clutch sleeve element,
        a reverse clutch sleeve element, and
        a movable clutch sleeve interposed between said forward and reverse clutch sleeve elements,
        said forward and reverse clutch sleeve elements being mounted to be permanently engaged with the other of said input and output shafts and mounted to be either of i) rotationally coupled with or ii) disengaged from the one of said input and output shafts by way of said movable clutch sleeve,
        the movable clutch sleeve being interdependent in rotation with the one of said input and output shafts at least below a predetermined torque, and is mounted to move axially on said one of said input and output shafts via a movement controller that occupies at least two positions including a forward position in which teeth of the movable clutch sleeve are engaged with teeth of of the forward clutch sleeve element, and a reverse position in which the teeth of the movable clutch sleeve are engaged with teeth of the reverse clutch sleeve element; and
    at least one blocking system that comprises at least one blocking element that is carried by the input shaft and that is drivable in rotation by said input shaft, said at least one blocking element mounted to move between at least two positions including an off position in which the movable clutch sleeve is permitted to operably switch between two or more operating positions, and an on position, in which said blocking element directly or indirectly prevents said movable clutch sleeve from operably switching between said two or more operating positions, wherein said at least one blocking element is sensitive to a speed of rotation of the input shaft and switches automatically from the off position to the on position when the input shaft is driven at a speed of rotation that exceeds a predetermined threshold value.

2. The direction reversing device according to claim 1, wherein the movement controller of the movable clutch sleeve comprises at least one control element with optional manual control, mounted to move between a forward control position of the movable clutch sleeve and a reverse control position of the movable clutch sleeve, and wherein at least one of the blocking element of the blocking system has at least one on position in which the blocking element prevents said control element from from operably switching.

3. The direction reversing device according to claim 2, wherein the blocking system is equipped with a return mechanism of said at least one blocking element in the off position.

4. The direction reversing device according to claim 3, wherein said at least one blocking element, is mounted to move axially along an axis that is parallel to a longitudinal axis of the input shaft.

5. The direction reversing device according to claim 4, wherein in the on position, the at least one blocking element is arranged on a path that is followed by the movement control element of the movable clutch sleeve.

6. The direction reversing device according to claim 5, wherein the at least one blocking element of the blocking system has a circular peripheral surface that forms, in the on position, a support surface of the control element that has at least one part that extends essentially tangentially to said support surface.

7. The direction reversing device according to claim 6, wherein the blocking system is formed by at least two plate elements, cup or flange, hollowed out, generally centrally, to be slippable onto the input shaft that carries the plate elements to be driven in rotation by said shaft, or the blocking system is formed from balls that are sandwiched between said plate elements, whereby said plate elements, that are equipped the return mechanism in close position, and comprises opposite surfaces that delimit a plurality of cages with the balls arranged radially around the input shaft, whereby each cage, which forms a guideway or movement path for at least one ball, has a mean height for housing the ball, taken parallel to the axis of the input shaft, which decreases from the central hollowed-out zone toward a periphery of said plate elements so as to cause, by moving the balls in the guideway that results from driving in rotation the input shaft beyond a predetermined speed of rotation, a separation of said plate elements, whereby at least one of the plate elements forms, in a position that is separated from the other plate element, the blocking element of said blocking system.

8. The direction reversing device according to claim 1, wherein the device for transmission of movement from the drive shaft to the input shaft is an endless, disengageable transmission and/or variable-speed transmission that comprises at least one belt and two pulleys around which said belt winds, at least one of the pulleys being carried by the input shaft, and at least a part of the blocking system also forms one flange of the pulley carried by the input shaft.

9. The direction reversing device according to claim 1, wherein:
the movable clutch sleeve is a sleeve that is mounted interdependent in rotation with the one of said input and output shafts that carries the movable clutch sleeve, and
the movable clutch sleeve is equipped at each end with clutch sleeve teeth that form a circular serration, and
the forward and reverse clutch sleeve elements each assume a shape of a conical pinion that is equipped on one of the conical pinion's surfaces with clutch sleeve teeth that are mounted in permanent engagement with the other of said input and output shafts by engaging with a gear part that is carried by said other of said input and output shafts.

10. The direction reversing device according to claim 1, wherein:
the device for transmission of movement from the drive shaft to the input shaft is a generally endless, disengageable transmission and/or variable-speed transmission, and
at least a part of the movement controller of the movable clutch sleeve also forms at least a part of a controller of variable speed and/or disengagement of the device for transmission of movement.

11. The direction reversing device according to claim 1, wherein the movement controller of the movable clutch sleeve comprises:
at least one rotary cam with manual rotary control; and
a fork that is angularly movable, said fork being equipped with at least one inside radial tooth that is insertable inside an outside peripheral annular groove of the movable clutch sleeve, and said rotary cam and said fork are coupled to one another by at least one lever.

12. A transmission between a drive shaft and wheels of an automotive wheeled vehicle, comprising:
at least one direction-reversing device of the vehicle that is equipped with an input shaft and a device for transmission of movement between the drive shaft and the input shaft of the direction-reversing device, wherein the at least one direction-reversing device of the vehicle is in accordance with claim 1.

13. The direction reversing device according to claim 2, wherein the device for transmission of movement from the drive shaft to the input shaft is an endless, disengageable transmission and/or variable-speed transmission that comprises at least one belt and two pulleys around which said belt winds, at least one of the pulleys being carried by the input shaft, and at least a part of the blocking system also forms one flange of the pulley carried by the input shaft.

14. The direction reversing device according to claim 3, wherein the device for transmission of movement from the drive shaft to the input shaft is an endless, disengageable transmission and/or variable-speed transmission that comprises at least one belt and two pulleys around which said belt winds, at least one of the pulleys being carried by the input shaft, and at least a part of the blocking system also forms one flange of the pulley carried by the input shaft.

15. The direction reversing device according to claim 4, wherein the device for transmission of movement from the drive shaft to the input shaft is an endless, disengageable transmission and/or variable-speed transmission that comprises at least one belt and two pulleys around which said belt winds, at least one of the pulleys being carried by the input shaft, and at least a part of the blocking system also forms one flange of the pulley carried by the input shaft.

16. The direction reversing device according to claim 5, wherein the device for transmission of movement from the drive shaft to the input shaft is an endless, disengageable transmission and/or variable-speed transmission that comprises at least one belt and two pulleys around which said belt winds, at least one of the pulleys being carried by the input shaft, and at least a part of the blocking system also forms one flange of the pulley carried by the input shaft.

17. The direction reversing device according to claim 6, wherein the device for transmission of movement from the drive shaft to the input shaft is an endless, disengageable transmission and/or variable-speed transmission that comprises at least one belt and two pulleys around which said belt winds, at least one of the pulleys being carried by the input shaft, and at least a part of the blocking system also forms one flange of the pulley carried by the input shaft.

18. The direction reversing device according to claim 7, wherein the device for transmission of movement from the drive shaft to the input shaft is an endless, disengageable transmission and/or variable-speed transmission that comprises at least one belt and two pulleys around which said belt winds, at least one of the pulleys being carried by the input shaft, and at least a part of the blocking system also forms one flange of the pulley carried by the input shaft.

19. The direction reversing device according to claim 2, wherein:
the movable clutch sleeve is a sleeve that is mounted interdependent in rotation with the one of said input and output shafts, and the movable clutch sleeve is equipped at each end with clutch sleeve teeth that form a circular serration, and
the forward and reverse clutch sleeve elements each assume a shape of a conical pinion that is equipped on one of the conical pinion's surfaces with clutch sleeve teeth that are mounted in permanent engagement with the other of said input and output shafts by engaging with a gear part that is carried by said other of said input and output shafts.

20. The direction reversing device according to claim 3,
wherein the movable clutch sleeve is a sleeve that is mounted interdependent in rotation with the one of said input and output shafts, and the movable clutch sleeve is equipped at each end with clutch sleeve teeth that form a circular serration, and
the forward and reverse clutch sleeve elements each assume a shape of a conical pinion that is equipped on one of the conical pinion's surfaces with clutch sleeve teeth that are mounted in permanent engagement with the other of said input and output shafts by engaging with a gear part that is carried by said other of said input and output shafts.

* * * * *